(12) United States Patent
Dickerson

(10) Patent No.: US 12,137,732 B2
(45) Date of Patent: Nov. 12, 2024

(54) REMOTE POWERED HOOKAH SYSTEM

(71) Applicant: Pserda Dickerson, Lithonia, GA (US)

(72) Inventor: Pserda Dickerson, Lithonia, GA (US)

( * ) Notice: Subject to any disclaimer, the term of this patent is extended or adjusted under 35 U.S.C. 154(b) by 324 days.

(21) Appl. No.: 17/515,860

(22) Filed: Nov. 1, 2021

(65) Prior Publication Data
US 2022/0132914 A1    May 5, 2022

Related U.S. Application Data

(60) Provisional application No. 63/110,031, filed on Nov. 5, 2020.

(51) Int. Cl.
| | | |
|---|---|---|
| *A24F 1/30* | (2006.01) | |
| *A24F 40/20* | (2020.01) | |
| *A24F 40/46* | (2020.01) | |
| *A24F 40/60* | (2020.01) | |
| *H02J 7/00* | (2006.01) | |

(52) U.S. Cl.
CPC ............... *A24F 1/30* (2013.01); *A24F 40/20* (2020.01); *A24F 40/46* (2020.01); *A24F 40/60* (2020.01); *H02J 7/0063* (2013.01)

(58) Field of Classification Search
CPC ........................................................ A24F 1/30
See application file for complete search history.

(56) References Cited

U.S. PATENT DOCUMENTS

| | | | | |
|---|---|---|---|---|
| 2010/0126516 | A1* | 5/2010 | Yomtov | .......... A24F 1/30 29/401.1 |
| 2017/0099873 | A1* | 4/2017 | Benjamignan | ...... H01M 10/425 |
| 2018/0110938 | A1* | 4/2018 | Trzecieski | ............... A61L 9/00 |
| 2020/0093175 | A1* | 3/2020 | Lako | ..................... A24F 1/30 |

* cited by examiner

*Primary Examiner* — Christopher M Rodd
*Assistant Examiner* — Adam Z Baratz
(74) *Attorney, Agent, or Firm* — Brennan, Manna & Diamond, LLC

(57) ABSTRACT

The present invention relates to a vehicle powered electronic hookah system that is designed to be used by a driver or passenger while driving an automobile and while obviating the need to use traditional charcoal for heating the tobacco. The hookah system includes a coil pack for heating tobacco to produce smoke for consumption by a consumer. The coil pack can be provided power using an electronic supply such as a vehicle's electronic power using a cigarette lighter plug or USB connector. Alternatively, a built-in rechargeable battery can be used for providing power to the coil. These power sources obviate the use of charcoal for heating the tobacco and maintain a clean and sanitary smoking area without worry of ashes. The hookah system can be placed in a cupholder in the vehicle and can be rotated in any direction for convenient use.

10 Claims, 5 Drawing Sheets

REMOTE POWERED HOOKAH SYSTEM

CROSS-REFERENCE TO RELATED APPLICATION

The present application claims priority to, and the benefit of, U.S. Provisional Application No. 63/110,031, which was filed on Nov. 5, 2020 and is incorporated herein by reference in its entirety.

FIELD OF THE INVENTION

The present invention relates generally to hookah systems. More specifically, the present invention relates to a vehicle-powered hookah system that can be used while driving an automobile while eliminating the need to use traditional charcoal for heating the tobacco. The hookah system includes a coil pack having heating coils that are used for heating tobacco to produce smoke for consumption by a consumer. The coil pack can be provided power using an electronic supply such as a vehicle's power using a plurality of connectors, such as a cigarette lighter plug or USB connector. Alternatively, a built-in rechargeable battery can be used for providing power to the coil. These power sources obviate the use of charcoal for heating the tobacco and enable a clean and sanitary smoking area without worry of ashes. Accordingly, the present disclosure makes specific reference thereto. Nonetheless, it is to be appreciated that aspects of the present invention are also equally applicable to other like applications, devices and methods of manufacture

BACKGROUND

By way of background, a hookah is a single or multi-stemmed instrument for smoking flavored tobacco, that was introduced to the world in India as early as the 16th century common era (CE). For hundreds of years, hookah users have been filtering flavored tobacco smoke through a water-filled jar before inhalation. Tobacco hookah devices are also known as shisha devices as they are used to smoke tobacco stored in a shisha bowl and are configured such that smoke passes through a water tank before inhalation by a consumer. Use of shisha devices is considered by many to be a leisure activity and a social experience.

The tobacco used in shisha devices may be mixed with other ingredients, for example, to increase the volume of the smoke produced, to alter flavor or both. Charcoal pellets are typically used as a heating source to heat the tobacco in a shisha device, which may cause full or partial combustion of the tobacco or other ingredients. Generally, a natural coal, such as Coco Brico Hookah Charcoal, or a quick-lighting coal, such as Ignite Quick Lite coals is used in standard hookahs. However, smoke emitted from charcoal is a source of numerous compounds that are hazardous to an individual's health. Analysis shows that raw charcoal can contain heavy metals such as zinc, iron, cadmium, vanadium, and cobalt at concentrations similar, if not higher than, cigarettes. Thus, the combustion of charcoal used to heat hookah tobacco may pose additional health risks for consumers. Further, the use of charcoal creates ash and an excessive mess.

Some people like to do hookah smoking in their vehicles. However, use of charcoal as a heating source for hookah is dangerous and uncomfortable for users. Further, charcoal may not always be available, which can prevent users from smoking hookah outside the home, and especially in their vehicles. People desire a hookah system that is easier to smoke, portable and uses readily available power sources.

Therefore, there exists a long-felt need in the art for an improved hookah that can be conveniently smoked in vehicles by users. There is also a long-felt need in the art for an improved hookah system that obviates the need to use traditional charcoal for heating the tobacco. Additionally, there is a long-felt need in the art for an improved hookah system that can be smoked using any existing electronic power supply. Moreover, there is a long-felt need in the art for an improved hookah system that improves the hookah smoking experience. Furthermore, there is a long-felt need in the art for an improved hookah system that maintains a clean and sanitary smoking area without worry of ashes. Finally, there is a long-felt need in the art for an improved hookah that allows users to still enjoy smoking hookah without using traditional charcoal for heating tobacco, and thus is safer for consumers.

The subject matter disclosed and claimed herein, in one embodiment thereof, comprises a vehicle-powered hookah system. The vehicle powered hookah system is safer, does not use charcoal for heating tobacco, and is configured to be used by a consumer while driving an automobile. The vehicle-powered hookah system features a heating or vaporizing coil pack, a shisha bowl for storing tobacco, a twist-off top for accessing the shisha bowl for placing tobacco, a down stem extending downwards from the shisha bowl to a water container, a wire having an integrated cigarette lighter plug, a USB connector, a rechargeable battery and a temperature controller. The cigarette lighter plug is configured to be inserted in a cigarette lighter port of a vehicle for receiving vehicle power and to transfer same to the coil pack through the wire. The coil pack vaporizes the tobacco stored in the shisha bowl when a temperature of the coil pack increases upon receiving vehicle power. Smoke or vapors from the shisha bowl travels to the water container through the down stem and is consumed through a hose from the water container, wherein the temperature of the coil pack can be controlled using a temperature controller by adjusting a voltage supplied to the coil pack. The hookah includes a cup base upon which the system can be placed in a cupholder of the vehicle.

In this manner, the improved hookah system of the present invention accomplishes all of the forgoing objectives and provides users with a hookah system that can be used in automobiles without worry of ashes. The hookah system can be powered using an existing power supply of the vehicle by connecting the hookah to the vehicle using any of a plurality of power ports, such as the cigarette lighter port, USB port, or rechargeable battery. The hookah system can be easily placed inside the vehicle and can be rotated in a desired direction for easy access of the hose.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a vehicle-powered hookah system. The vehicle-powered hookah system is configured to be used by a consumer while driving an automobile. The vehicle-powered hookah system further comprising a coil pack that includes heating or vaporizing coils, a shisha bowl for storing tobacco, a twist-off top for accessing the shisha bowl, a down stem extending downwards from the shisha bowl to a water container, a wire having an integrated cigarette lighter plug, a USB connector, a rechargeable battery and a temperature controller. The cigarette lighter plug is configured to be inserted in a cigarette lighter port of a vehicle for receiving vehicle power and to transfer same to the coil pack through the wire. The coil pack vaporizes the tobacco stored in the shisha bowl when temperature of the coil pack increases upon receiving vehicle power. Smoke or vapors from the shisha bowl travel to the water container through the down stem and is consumed through a hose from the water container, wherein the temperature of the coil pack can be controlled using the temperature controller by adjusting the voltage supplied to the coil pack.

In yet another embodiment, the coil pack can be supplied power by inserting a USB connector into a USB port of the vehicle or by using a rechargeable battery of the hookah system.

In yet another embodiment, an electronic hookah system that does not use charcoal for heating tobacco is disclosed. The electronic hookah system includes a plurality of connectors for receiving a vehicle's power for heating tobacco wherein the plurality of connectors includes a cigarette lighter connector for inserting into the vehicle's cigarette lighter port and a USB connector for inserting into the vehicle's USB port. The vehicle's power is used for heating a coil pack having vaporizer coils wherein the coil pack is placed under the tobacco for vaporizing the tobacco.

In yet another embodiment, voltage from the connectors can be adjusted by a temperature controller for controlling temperature of the coil pack to adjust the heating of the tobacco. In yet another embodiment of the present invention, a shisha device is disclosed. The shisha device includes a water container connected to a shisha bowl through a down stem, the water container includes a water filler and a water lid, a coil pack positioned below the shisha bowl for heating the tobacco placed in shisha bowl wherein the coil pack receives power for heating the tobacco from an electronic power source wherein the electronic power source is one of a vehicle's power supply, a rechargeable battery or a handheld electronic device. The smoke generated upon heating the tobacco travels through the down stem to the water container for consuming by a consumer.

In yet another embodiment, the shisha device includes an automatic cut-off that stops the electrical supply to the coil pack. The automatic cut-off can be based on one of the two factors including a pre-determined threshold temperature or a pre-determined time period.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
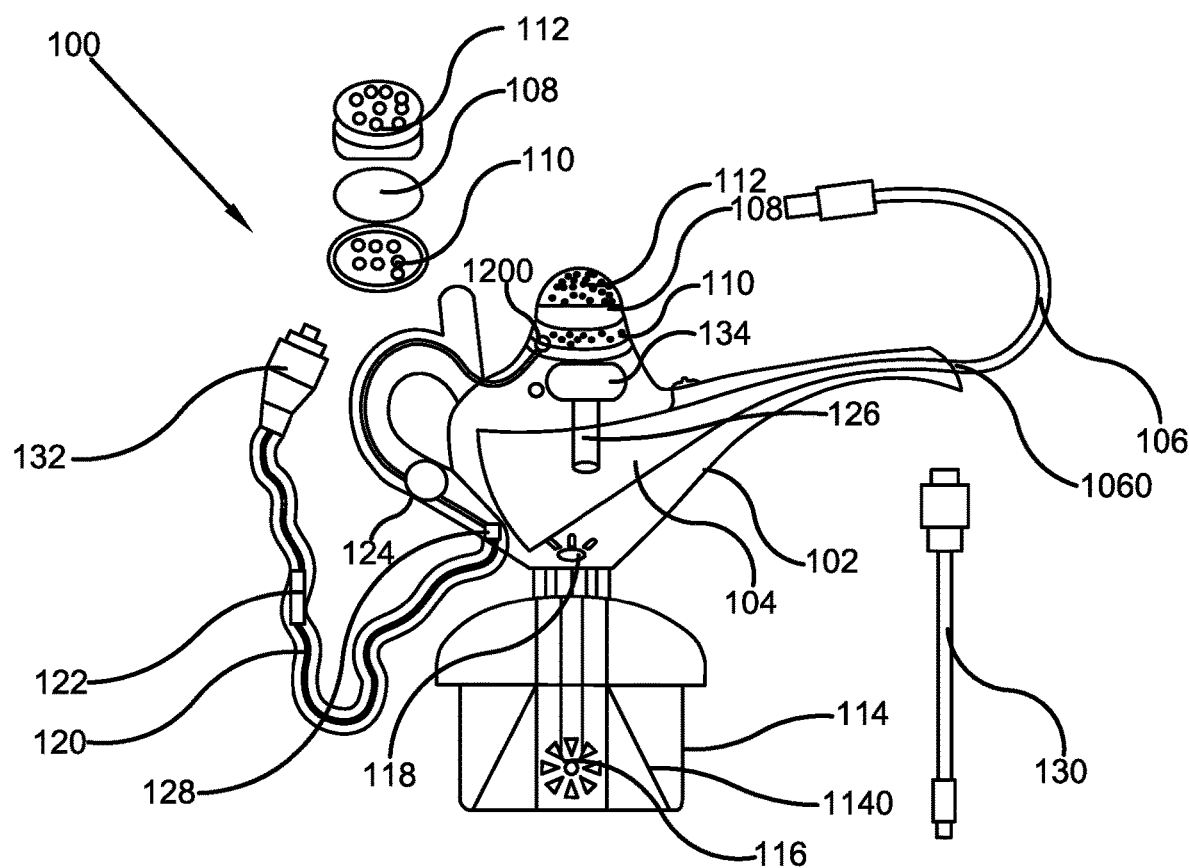
FIG. 1 illustrates a perspective view of one potential embodiment of a vehicle-powered hookah system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved hookah that can be conveniently smoked in vehicles by users. There is also a long-felt need in the art for an improved hookah system that obviates the need to use traditional charcoal for heating the tobacco. Additionally, there is a long-felt need in the art for an improved hookah system that can be smoked using any existing electronic power supply. Moreover, there is a long-felt need in the art for an improved hookah system that improves the hookah smoking experience. Furthermore, there is a long-felt need in the art for an improved hookah system that maintains a clean and sanitary smoking area without worry of ashes. Finally, there is a long-felt need in the art for an improved hookah that allows users to still enjoy smoking hookah without using traditional charcoal for heating tobacco, and thus is safer for consumers.

The present invention, in one exemplary embodiment, is a novel electronic hookah system that does not use charcoal for heating tobacco. The electronic hookah system includes a plurality of connectors for receiving a vehicle's electronic power for heating tobacco, wherein the plurality of connectors includes a cigarette lighter for inserting into the vehicle's cigarette lighter port and a USB connector for inserting into the vehicle's USB port. The vehicle's electronic power supply can be used for heating a coil pack having vaporizer coils, wherein the coil pack is placed under the tobacco for vaporizing the tobacco.

Referring initially to the drawings, FIG. 1 illustrates a perspective view of one potential embodiment of a vehicle-powered hookah 100 of the present invention in accordance with the disclosed architecture. The vehicle powered hookah 100 can comprise the following components: a bottle 102, a water container 104, at least one hose 106 extending from the water container 104, at least one shisha bowl 108, a coil pack 110, a twist-off top 112, a cup 114 that includes a rotating means 116, a light source 118 housed in the bottle 102 for illumination, and a wire 120 releasably-connected to the coil pack 110 for heating shisha placed in the shisha bowl 108. Additional components for enhancing the hookah experience of a user can include a temperature controller 122 for controlling the temperature of heating of the hookah, a rechargeable battery 124 for providing power for heating the coil pack 110, and a down stem 126 extending from the coil pack 110 to the water container 104. A USB port 128 can be provided and connected to wire 120, thereby enabling an additional power source such as a power bank using a conventional USB cable 130 for providing power for the working of the hookah 100. Each of the potential components of the vehicle-powered hookah 100 are described in the following paragraphs.

In the present embodiment, a variety of power sources can be used for providing power to the hookah 100. The hookah 100 can contain a rechargeable battery 124 coupled to the wire 120 that is connected to the coil pack 110 through a connector 1200 for providing the necessary power. The rechargeable battery 124 can be a Li-Ion battery of 1300 mAh. For use in a moving vehicle, the coil pack 110 can be supplied power by using vehicle cigarette lighter plug 132 positioned at one end of the wire 120, thereby obviating the use of conventional charcoals. The vehicle cigarette lighter plug 132 can be integrated to the wire 120, which can be connected to the coil pack 110. The heating coils positioned within the coil pack 110 become heated upon receiving power from the vehicle using the vehicle cigarette lighter plug 132 and the wire 120. For providing power through a portable device such as a power bank, a USB port 128 coupled to the wire 120 is also provided that can be connected to any external device using a conventional USB cable 130. The wire 120 is detachably-connected to the coil pack 110 and provides electrical power to the heating coils and thus obviates the use of traditional coals/charcoal for heating the shisha 108 placed above the coil pack 110. Eliminating use of the traditional charcoal maintains a clean and sanitary smoking area without worry of ashes, and improves the hookah smoking experience as a user can easily plug the hookah 100 directly into a cigarette lighter or other power socket, such as the USB port inside of an automobile.

The hookah 100 includes a voltage or temperature regulator 122 connected to the power supply (wire) 120. The temperature regulator can be placed on or around a hookah's body circumference. The voltage or temperature regulator 122 can be used for adjusting voltage supplied to the coil pack 110 through the wire 120 as a higher voltage can result in a higher temperature in the coil pack 110, thus atomizing the shisha quickly. The voltage regulator 122 can have an ON/OFF push button for providing control of the temperature of the coil pack 110. The ON/OFF push button upon being pressed, can activate the temperature control of the coil pack 110.

For producing smoke from the shisha placed in the shisha bowl 108, a down stem 126 is submerged in water in the water container 104. The water container 104 is housed within the bottle/housing 102. The water container 104 is filled with water to submerge the down stem 126, while a top end of the down stem 126 is connected to the coil pack 110. The shisha bowl 108 is placed above the heating coil pack 110, which causes the tobacco in the bowl 108 to heat up and smoke using power provided by one of the power sources (i.e. remote power sources) described earlier. When a user sucks through the hose 106, more heat is drawn into the tobacco/shisha and helps accelerate the heat transfer. When sucking on the hose is performed by a user, the smoke is drawn down through the down stem 126 and underwater in the water container 104. The smoke then rises above the water in the water container 104 and into the hose port opening 1060. The hose port opening 1060 connects directly to the hose 106 and does not connect to any part of the down stem 126. Accordingly, the smoke continues its path through the hose port 1060 and hose 106 until it reaches the smoker's mouth. For adding shisha/tobacco in the shisha bowl 108, a twist-off top 112 can be removed and can also be securely placed thereto to retain the shisha in the bowl 108.

The electronic hookah 100 includes a cup base 114 having a diameter and circumference that can be used for placing and securing the hookah 100 in the interior of a vehicle such as in a cupholder or on any flat surface. The cup 114 includes a cavity 1140 that can contain a rotating means 116, such as a rotating pulley, that can be used for rotating the bottle 102 and orienting the other components of the hookah 100. The aforementioned is useful as it prevents tangling and looping of hose 106 and enables the hookah 100 to be used by multiple people sitting in the vehicle. On the surface of bottle/body 102, the hookah 100 can have a logo or any other indicia 134 that can be used for personalization or marketing purposes.

For providing aesthetic appeal to the electronic hookah 100, a plurality of illuminating sources 118, for example Light Emitting Diodes (LEDs) can be positioned in the bottle/body 102. The LEDs can be illuminated when the hookah 100 is supplied power by the wire 120 using a power source.

The electronic or vehicle powered hookah 100 is small, compact and portable. The hookah 100 can be made from acrylic or plastic and is designed to be lightweight for easy placement in a vehicle. The hookah 100 is especially designed to be used while driving an automobile by plugging the system 100 directly into a cigarette lighter or other power socket inside of an automobile.

Figure 2:
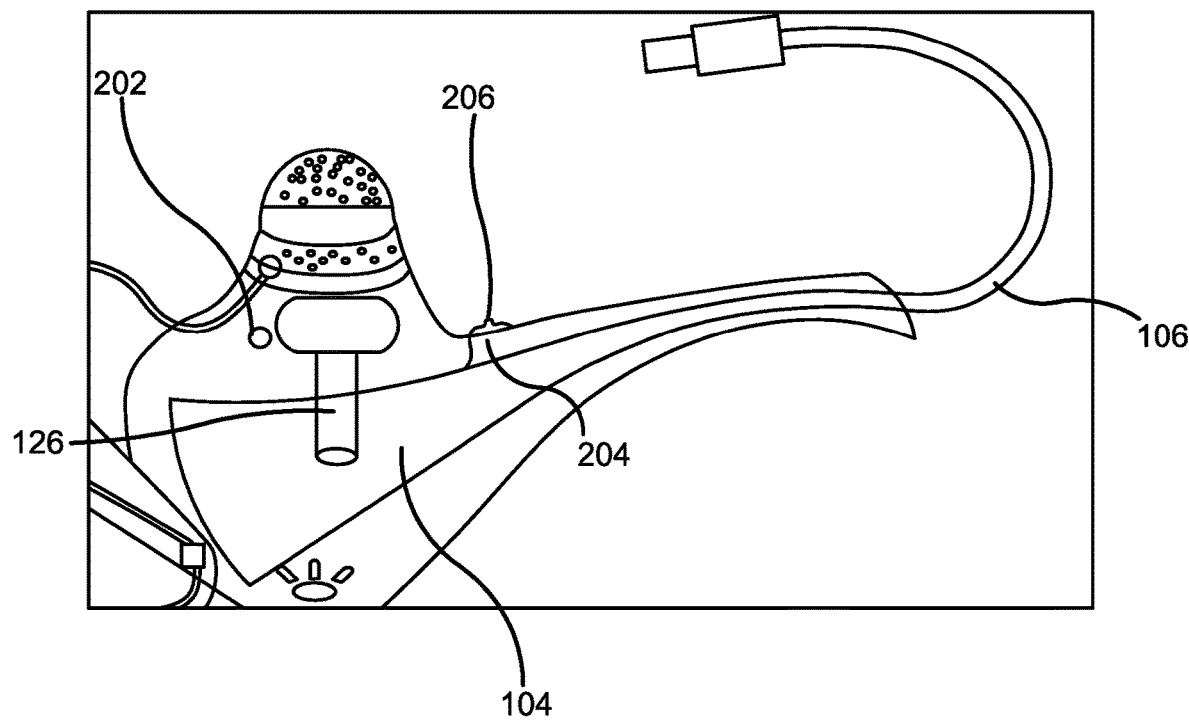
FIG. 2 illustrates a perspective view showing a release valve, a water lid, and a filler used in the one potential embodiment of the vehicle-powered hookah system of the present invention in accordance with the disclosed architecture.

FIG. 2 illustrates a perspective view showing release valve 202, water lid 204 and the filler 206 used in the one potential embodiment of the vehicle powered hookah 100 of the present invention in accordance with the disclosed architecture. The electronic hookah 100 has a release valve 202 that is used for clearing out stagnant smoke. The release valve 202 is an exit-only valve that releases smoke. In use, a user blows into the hose 106 wherein the smoke is pushed back into the container 104 and to the release valve 202. The air pushing up through the release valve 202 causes a metal ball bearing (not shown) to rise up which allows the smoke to be released. The water filler 206 can be used for filling water in the container 104 which allows the smoke to be sucked through the hose 106 by a user. The container 104 can store up to 750 ml of water that can provide hookah experience for up to thirty minutes in a single session. The lid 204 of the container 104 creates a seal for preventing water from spilling in case the automobile in which the hookah 100 is placed faces a sudden acceleration or deceleration. The lid 204 can be made from an elastomer, particularly preferably made of EPDM (ethylene-propylene-diene rubber), glass (i.e. frosted glass), ceramic, or a plastic material, for example acrylic.

Figure 3:
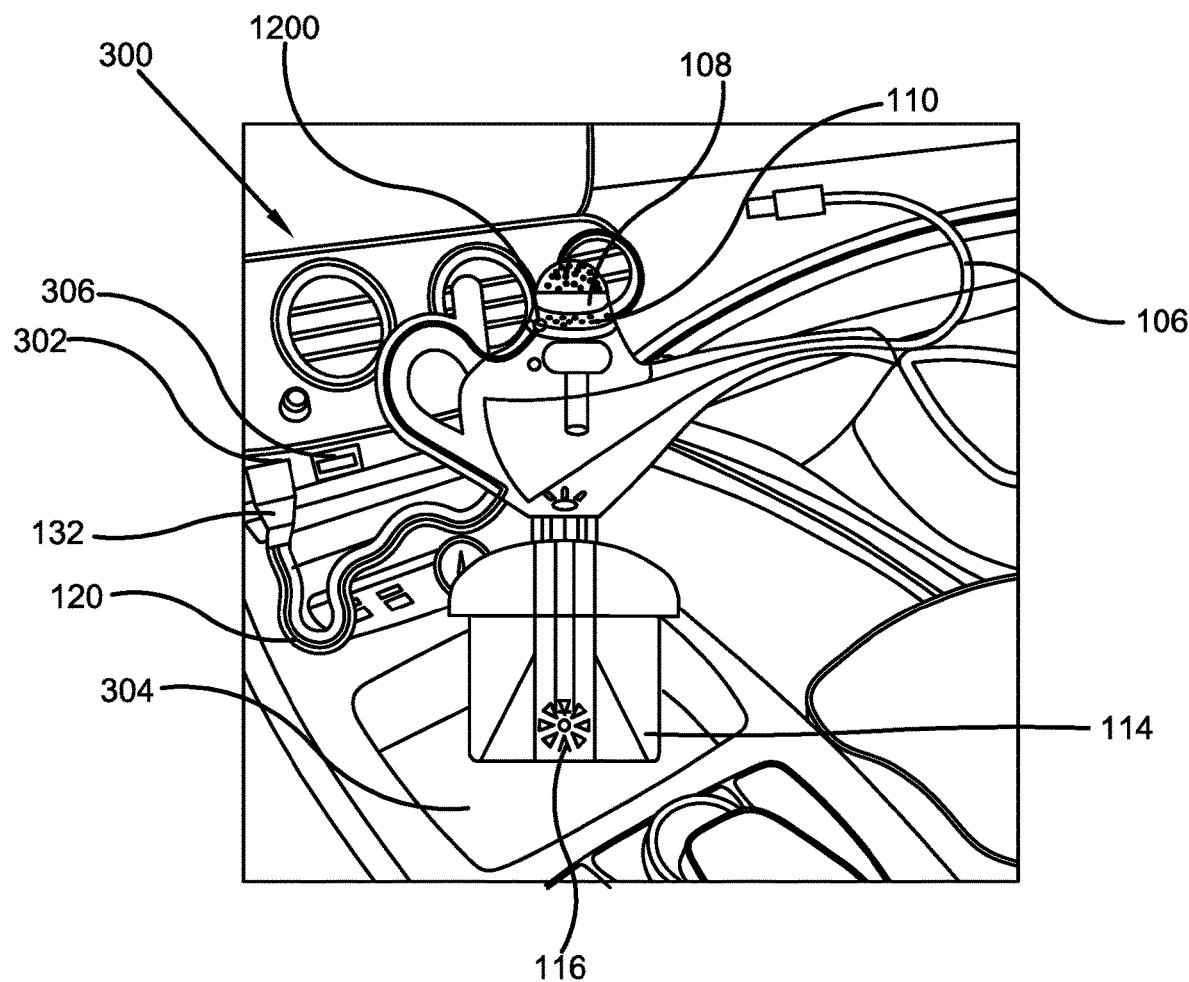
FIG. 3 illustrates a partial perspective view of inside of a vehicle showing the electronic hookah system of the present invention plugged into a cigarette lighter of the vehicle in accordance with the disclosed architecture.

FIG. 3 illustrates a partial perspective view of inside of a vehicle 300 showing the electronic hookah 100 of the present invention plugged into a cigarette lighter of the vehicle 300 in accordance with the disclosed architecture. For use in a driving vehicle 300 and without use of traditional charcoal, the wire 120 with integrated cigarette lighter plug 132 can be plugged into cigarette lighter power socket 302 of the vehicle 300. This allows the use of vehicle's electronic power for heating the coil pack 110 that creates the smoke from the shisha bowl 108 that can be sucked using a hose 106. The wire 120 transfers the power from the cigarette lighter power socket 302 to the coil pack 110 wherein the wire 120 connects to the coil pack 110 through the connector 1200. The hookah 100 can be placed anywhere inside the vehicle 300 and preferably in a cupholder 304 using the cup base 114. The rotating means 116 rotates the hookah 100 so that the hose 106 can be used in any direction and by multiple people sitting inside the vehicle 300 without entangling the hose 106. Similarly, the USB connector of the hookah 100 as shown in FIG. 1 can be inserted into the USB port 306 of the vehicle 300. The USB connector of the hookah 100 is compatible with 3.1 Amp, 1 Amp, and 5 Amp USB ports of different vehicles.

Figure 4:
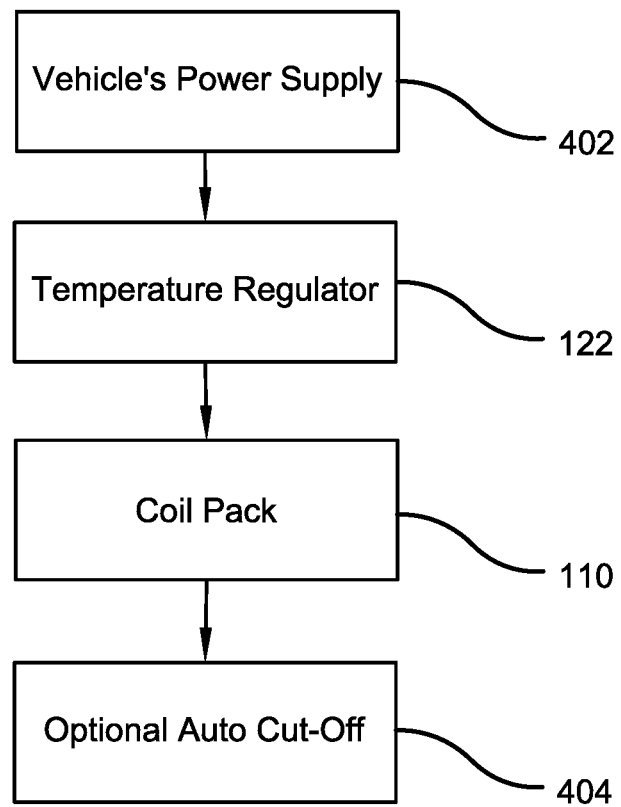
FIG. 4 illustrates a functional diagram showing exemplary control flow for controlling the temperature of the coil pack of the electronic hookah system in accordance with the disclosed architecture.

FIG. 4 illustrates a functional diagram showing an exemplary control flow for controlling the temperature of the coil pack 110 of the electronic hookah 100 in accordance with the disclosed architecture. Using the wire of the hookah 100 connected to any suitable power port of the vehicle, the vehicle's power supply 402 can be provided to the hookah 100. The power ports can be one or more of the cigarette lighter port, USB port, or any other port. Alternatively, a built-in rechargeable battery of the hookah 100 can be used for providing portable electrical power to the hookah 100. The temperature regulator 122 is coupled to the wire and is used for controlling the voltage and thus the temperature supplied to the coil pack 110 of the hookah 100. The voltage can be adjusted as per the desire of a user to generate smoke faster or slower. The temperature regulator 122 directly controls the heating of the coil pack 110 and thus smoke produced from the shisha is controlled. In the present invention, an optional automatic cut-off 404 is provided in the hookah 100. The cut-off 404 automatically stops the power to the coil pack 100 in case the temperature of the coil pack 110 reaches a predetermined level. In one potential embodiment, the threshold temperature for automatic cut-off is 400 degrees Fahrenheit. Alternatively, the power can be stopped if the power is provided to the coil pack 110 for a pre-determined time period. In the preferred embodiment, the pre-determined time for automatic cut-off is 15 minutes. The cut-off provides a safety feature for the driver and other passenger of the vehicle in which the hookah 100 is placed.

Figure 5:
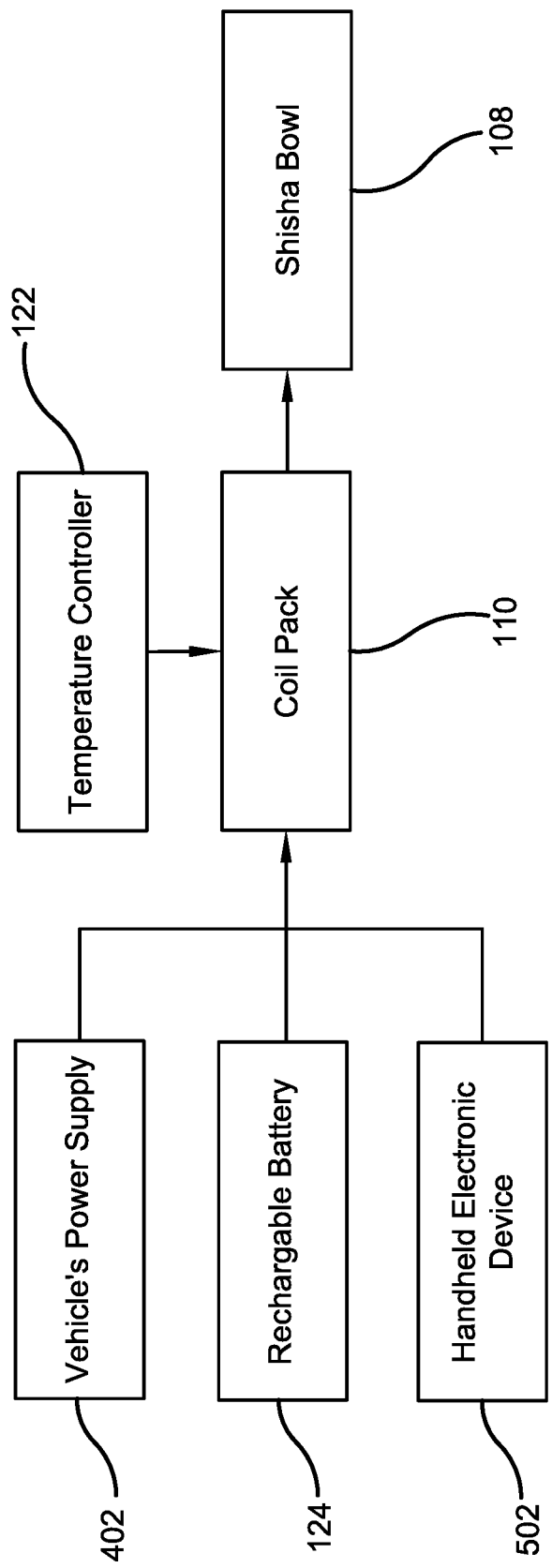
FIG. 5 illustrates a functional diagram showing different types of power supplies that can be used for heating the coil pack for creating smoke from tobacco placed in a shisha bowl of the electronic hookah system in accordance with the disclosed architecture.

FIG. 5 illustrates a functional diagram showing different types of power supplies that can be used for heating the coil pack for creating smoke from tobacco placed in shisha bowl of the electronic hookah 100 in accordance with the disclosed architecture. The hookah 100 of the present invention obviates the use of traditional charcoal that creates ash and is more harmful for both the consumer and the environment. A variety of power sources (i.e. remote power sources) can be used for providing power to the coil pack 110 of the hookah 100 using the ports provided in the hookah 100. As shown, the vehicle's electronic power supply 402 (provided by a battery of the vehicle), an integrated rechargeable battery 124 in the hookah 100, and a handheld electronic device 502 using the USB port of the hookah 100 can be used for providing power to the coil pack 110. The temperature and the power provided by the remote power sources 402, 124, 502 can be regulated by the temperature controller 122 such that an adequate and a desired quantity of smoke is released from tobacco stored in the shisha bowl 108.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "vehicle-powered hookah", "electronic hookah", "hookah", and "system" are interchangeable and refer to the electronic hookah 100 of the present invention.

Notwithstanding the forgoing, the electronic hookah 100 of the present invention can be of any suitable size and configuration as is known in the art without affecting the overall concept of the invention, provided that it accomplishes the above stated objectives. One of ordinary skill in the art will appreciate that the size, configuration, and material of the electronic hookah 100 as shown in the FIGS. are for illustrative purposes only, and that many other sizes and shapes of the electronic hookah 100 are well within the scope of the present disclosure. Although the dimensions of the electronic hookah 100 are important design parameters for user convenience, the electronic hookah 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A remote powered hookah system comprising:
a bottle;
a water container;
at least one hose extending from said water container;
at least one shisha bowl;
a coil pack;
a twist-off top;
a cup base;

a remote power source for powering an electronic wire releasably connected to said coil pack for heating a shisha placed in said at least one shisha bowl, wherein said cup base includes a circumference configured to rest in a vehicle cupholder;

a coil pack temperature controller comprising an automatic power cut-off; and a rotating pulley housed within a cavity in the cup base for rotating the remote powered hookah system when the cup base is positioned within a cupholder of a vehicle.

2. The remote powered hookah system of claim 1, wherein said remote power source comprises a rechargeable battery at a first end of said electronic wire for providing power for heating of said coil pack.

3. The remote powered hookah system of claim 1, wherein said remote power source comprises a vehicle cigarette lighter plug positioned at a first end of said electronic wire for providing power for heating of said coil pack.

4. The remote powered hookah system of claim 2, wherein said remote power source comprises a USB port and a USB cable coupled to said electronic wire.

5. The remote powered hookah system of claim 1 further comprising a down stem extending from said coil pack to said water container.

6. The remote powered hookah system of claim 1 further comprising a USB port and a USB cable connected to said electronic wire to enable said remote power source to provide power to said remote powered hookah system.

7. The remote powered hookah system of claim 1 further comprising a light source housed in said bottle for illumination.

8. A vehicle powered hookah system comprising:
a bottle comprising a release valve and at least one indicia;
a water container;
at least one hose extending from said water container;
at least one shisha bowl;
a coil pack;
a top;
a remote power source for powering an electronic wire releasably connected to said coil pack for heating a shisha placed in said shisha bowl, wherein said remote power source comprises a vehicle cigarette lighter plug positioned at a first end of said electronic wire for providing power for heating of said coil pack;
a cup base having a diameter and a circumference configured to rest in a vehicle cupholder; and
a rotating pulley housed within a cavity in the cup base for rotating the remote powered hookah system when the cup base is positioned within the vehicle cupholder.

9. The vehicle powered hookah system of claim 8 further comprising a voltage regulator connected to said remote power source for adjusting a voltage supplied to said coil pack through said electronic wire.

10. The vehicle powered hookah system of claim 9, wherein said voltage regulator comprises an ON/OFF switch for controlling a temperature of said coil pack.

\* \* \* \* \*